(12) United States Patent  (10) Patent No.: US 8,880,125 B2
Shyamalan  (45) Date of Patent: Nov. 4, 2014

(54) METHOD AND APPARATUS FOR CONTROLLING MOBILE COMMUNICATIONS ACCESS WHILE IN MOTION

(75) Inventor: Shyam T. Shyamalan, Hillsborough, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 3 days.

(21) Appl. No.: 13/523,398

(22) Filed: Jun. 14, 2012

(65) Prior Publication Data

US 2013/0337763 A1 Dec. 19, 2013

(51) Int. Cl.
*H04M 1/00* (2006.01)
*H04M 1/60* (2006.01)

(52) U.S. Cl.
CPC .......... *H04M 1/6091* (2013.01); *H04M 1/6066* (2013.01)
USPC ................... 455/569.2; 455/569.1; 455/404.1

(58) Field of Classification Search
None
See application file for complete search history.

(56) References Cited

U.S. PATENT DOCUMENTS

| 7,966,025 | B1 * | 6/2011 | O'Neil | 455/456.4 |
| 2011/0039581 | A1 * | 2/2011 | Cai et al. | 455/456.4 |
| 2012/0034867 | A1 * | 2/2012 | Griffin et al. | 455/41.1 |
| 2012/0252420 | A1 * | 10/2012 | Czaja et al. | 455/414.1 |
| 2012/0268235 | A1 * | 10/2012 | Farhan et al. | 340/3.1 |

* cited by examiner

*Primary Examiner* — Suhail Khan

(57) ABSTRACT

Methods and related systems modify, limit, or restore restrictions imposed on a mobile communications device, due to being in a moving vehicle, upon establishing contact with a near field communications (NFC) tag. Since the imposed modifications may impact all mobile communications devices positioned in the moving vehicle, including those belonging to passengers other than the driver, the NFC tag is used to modify the restriction imposed on the devices belonging to the passengers. The NFC tag triggers activation of instructions that remove the imposed modifications on the mobile communications device and is positioned in close proximity to the passengers such that it is easily accessed by the passengers but may not be easily accessed by the driver. The mobile communications device uses the instructions to remove the imposed modifications and allow the user to access the communications functions.

23 Claims, 3 Drawing Sheets

METHOD AND APPARATUS FOR CONTROLLING MOBILE COMMUNICATIONS ACCESS WHILE IN MOTION

BACKGROUND

The distractions caused by operating a mobile communications device, such as a wireless phone and/or a mobile tablet, while in a moving vehicle may result in life threatening accidents. For example, a driver operating a moving vehicle would need to use one hand to hold his/her mobile device and/or split his/her attention between watching the road and dialing a number or reading a text message or email. In the recent years, significant effort has been focused on preventing access to mobile communications devices while operating a motor vehicle.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
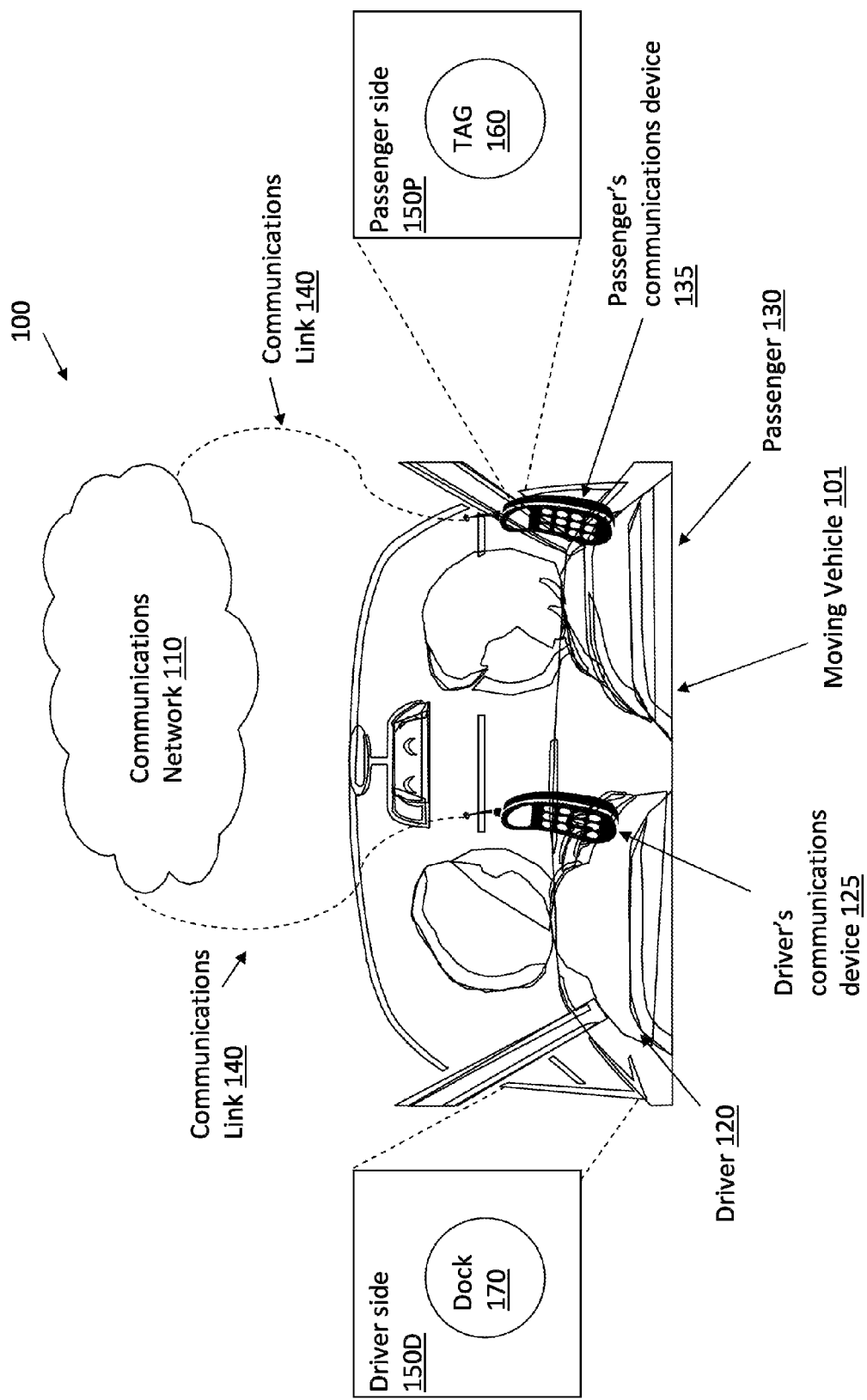
FIG. 1 is an illustration of a perspective view of certain embodiments disclosed herein.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

Certain embodiments disclosed herein relate to methods, computer implemented methods, and corresponding systems for controlling usage of a mobile communications device while in motion. In some embodiments, certain restrictions, including but not limited to device restrictions (e.g., device software lock), restrictions of mobile communications functions, or restrictions of access to mobile communications functions may be imposed on the mobile communications device due to being in a moving vehicle.

Instructions for modifying such restrictions may be stored in various locations, such as on the mobile communications device of a user riding in the moving vehicle. The user may be a passenger of the moving vehicle. As used herein, a passenger is defined to be a person in a vehicle other than the driver.

Regardless of where the instructions for modifying the restrictions are stored, these instructions are activated by establishing an interaction between the mobile communications device and a near field communications tag positioned in close vicinity of the passenger of the motor vehicle. The interaction between the mobile communications device and the near field communications tag may be established by bringing the mobile communications device in direct contact with or in close vicinity of the near field communications tag. The instructions for modifying the restrictions are activated (e.g., read and executed) upon establishing interaction between the mobile communications device and the near field communications tag. Once activated, the instructions trigger modification of the restrictions imposed on the mobile communications device.

In some embodiments, the restrictions imposed on the mobile communications device may include a software lock that prevents access to the mobile communications device (e.g., a lock that prevents access to the home screen of a mobile phone). In certain embodiments, the restrictions may include restrictions that restrict (e.g., turn off) certain communications functions of the mobile communications device while in the moving vehicle. In some embodiments, the restrictions may include restrictions that prevent access to the certain communications functions of the communications device.

In some embodiments, the mobile communications functions or access to mobile communications device or functions are restored in response to the mobile communications device establishing an interaction with the near field communication tag. In certain embodiments, while the vehicle is in motion, restrictions are only removed/modified in response to the communications device establishing an interaction with a near field communications tag positioned in close proximity of a user other than the driver of the moving vehicle.

In certain embodiments, once an interaction between the communications device and the near field communications tag is established, a processor, included in the mobile communications device, processes the instructions for modifying the restrictions. The processed information is used to modify the restrictions imposed on the mobile communications device.

In some embodiments, the restrictions imposed on the communications device may include restrictions that modify, reduce, or disable at least one of: certain mobile communications functions, access to the certain mobile communications functions provided by the mobile communications device, or access to the communications device. The mobile communications functions may include at least one of voice call, video call, web browsing, text messaging, or instant messaging.

In some embodiments, the restrictions imposed on the communications device or communications functions may be modified, restored, or removed in response to detecting that the mobile communications device is connected to a unit that provides hands-free access to the mobile communications device. In certain embodiments, the restrictions imposed on the communications device may be modified, restored, or removed in an event a request for conducting an emergency communications call is received.

In certain embodiments, the restrictions may be imposed in response to detecting that the mobile communications device is in a moving vehicle. In some embodiments, it may be determined that the mobile communications device is in the moving vehicle in response to at least one of detecting that a speed at which location of the communications is changing is greater than a predetermined threshold or an indication received from a user of the mobile communications device.

In certain embodiments, the restrictions may be modified for a pre-determined period of time after the interaction with the near field communications tag is established. The modified restrictions may be restricted once the pre-determined period of time has lapsed.

FIG. 1 is an illustration of a perspective view of certain embodiments 100 disclosed herein. A driver 120 and one or more passengers 130 may be traveling in a moving vehicle 101. The driver 120 and passengers 130 may be equipped with one or more mobile communications devices 125, 135. Examples of the mobile communications devices 125, 135 that may be used with the embodiments disclosed herein include, but are not limited to, mobile phones, Personal Digital Assistants, portable televisions, laptop computers, digital video recorders, etc.

The driver 120 and passengers 130 may connect to a communications network 110, via respective communications links 140, and gain access to various communications functions (e.g., voice calls, video calls, data access, web browsing, text messaging, etc.) through their respective mobile communications device 125, 135. Certain restrictions, including but not limited to device restrictions (e.g., device software lock), restrictions of mobile communications functions, or restrictions of access to mobile communications functions may be imposed on each mobile communications device 125, 135 due to being in a moving vehicle.

In some embodiments, each mobile communications device 125, 135 may be equipped with near field communications (NFC) capabilities. The NFC includes a set of wireless technology protocols that may be used by the mobile communications device 125, 135 to establish communications with NFC enabled end-points by coming in close vicinity of the NFC enabled end-points or in direct contact (e.g., touching) with NFC enabled end-points. The NFC capabilities of the mobile communications device 125, 135 further enable the device to establish communications with an NFC chip, hereinafter referenced as an "NFC tag."

In some embodiments, the moving vehicle 101 may be equipped with an NFC end-point 160. The NFC end-point may be an unpowered NFC end-point. For example, in certain embodiments, the NFC end-point 160 may be an unpowered NFC tag.

The restrictions imposed on the communications devices positioned in a moving vehicle, impact all communications devices in the moving vehicle including the mobile communications device 135 of the passenger 130 traveling in the moving vehicle 130. Since these restrictions on the passenger's mobile communications device 135 are imposed by proxy and are not intended for the passenger's mobile communications device 135, certain embodiments disclosed herein remove the restrictions imposed on the passenger's mobile communications device 135 by utilizing the NFC tag 160 to identify the mobile communications device 135 belonging to the passenger 130 of the moving vehicle and remove the imposed restrictions.

In some embodiments, the NFC tag 160 may activate data or instructions that when recognized or executed by the mobile communications device 125, 135 allow otherwise restricted communications functionalities of the mobile communications device 125, 135 to be modified or restored. The mobile communications device 125, 135 includes the instructions for changing its communications functionalities and activates the instructions by coming in close vicinity of the NFC tag (e.g., by tapping the mobile communications device 125, 135). Once activated, the instructions cause the communications device to modify the communications restrictions imposed on the communications device.

For example, while in motion, if the passenger 130 wishes to use his/her mobile communications device 135, he/she may indicate that the mobile communications device is intended for use by users other than the driver 120 by activating the NFC tag 160 positioned in the passenger side 150P of the moving vehicle 101. The NFC tag 160 activates instructions for removing the restrictions imposed on the mobile communications device 135 due to being in the moving vehicle 101. The passenger's mobile communications device 135 includes the instructions for removing the restrictions and, after coming in the proximity of the NFC tag 160 (e.g., by being tapped against the tag 160), executes the instructions. Once executed by the mobile communications device 135, the instructions remove (or allow the passenger to remove, e.g., using prompts) the restrictions previously imposed on the mobile communications device and allow the passenger 130 to access the communications functions available through his/her device 135.

In some embodiments, the tag 160 may be installed in the passenger side 150P of the moving vehicle 101 such that it may be accessed by the passenger 130. In some embodiments, the tag 160 may not be easily accessible to the driver 120. In certain embodiments, the tag 160 may be positioned in a location accessible by the passenger 130 positioned in or near the front passenger seat 150-P of the moving vehicle 101 (e.g., in an area near the passenger side door). In some embodiments, the rear seats (not shown) of the moving vehicle 101 may further be equipped with one or more tags 160.

Although not shown in FIG. 1, in some embodiments, the driver side 150D of the moving vehicle 120 may also be equipped with a tag 160. In certain embodiments, the position of the NFC tag 160 (i.e., passenger side 150P or driver side 150D) may be used as a differentiating factor for distinguishing between the driver's communications device 125 and the passenger's communications device 135. For example, in some embodiments, the tag 160 positioned in close proximity of a passenger may be arranged such that, once an interaction between the tag 160 the communications device 135 is established, all of the functions offered by the communications device 135 are restored. However, the tag 160 positioned in close proximity of a driver may be arranged such that, once an interaction between the tag 160 the communications device 125 is established, only a limited set of functions offered by the communications device 125 are restored and/or the functions are restored for a limited period of time. Thus, in some embodiments the functionality restored by each tag may vary dependent on the location of the tag when multiple tags are disposed in or near different seats in the vehicle.

In some embodiments, the tag 160 may be disposed so as to be accessible by one or more of the passengers but relatively inaccessible to the driver when the vehicle is in motion. In some embodiments, the tag 160 may be installed at any location within the vehicle. For example, the tag may be installed on the interior side of each of the doors of the vehicle or on the interior side of each of the side windows of the vehicle 101.

The tag 160 may be included in the vehicle 101 during manufacture, for example by the vehicle 101 manufacturer. In some embodiments, the tag 160 may be installed in the vehicle 101, voluntarily, by the vehicle owner or operator and/or as a part of a mandated vehicle inspection process.

In certain embodiments, the vehicle 101 may be equipped with a dock 170 for docking the driver's mobile communications device 125. Although shown on the driver side 150D of the vehicle 101, the dock 170 may be placed anywhere within the moving vehicle 101 that is accessible to the driver 120. In some embodiments, the dock 170 may be a built-in unit that is installed at the time of manufacture by the vehicle 101 manufacturer. In some embodiments, the dock 170 may be an external unit that is installed in the vehicle 101. In certain embodiments, the dock 170 may provide the driver 120 with the ability to conduct hands-free communications calls. The dock 170 may contain a mechanical mechanism that automatically overrides some or all restrictions on functionality only when a mobile communications device is disposed therein and thereby contacts the mechanism or when the mobile communications device otherwise is able to electronically detect that it is installed in the dock 170.

Although not shown, in some embodiments, the driver 120 may use a headset or a blue-tooth system that enables the driver 120 to use his/her mobile communications device 125 in a hands-free mode. Other hands-free options available in the art may be used to provide the driver 120 with hands-free access to his/her mobile communications device 125.

In some embodiments, a device user (i.e., driver 120 or passenger 130) may issue an indication that the mobile communications device 125, 135 is being used in a moving vehicle 101. For example, in some embodiments, the device user 120, 130 may use an application, application programming interface, or a physical key (not shown) to indicate that the phone is in a moving vehicle 101. In other embodiments, each mobile communications device 125, 135 may automatically detect that it is in a moving vehicle. In some embodiments, the device user 120, 130 may indicate that the mobile communications device 125, 135 is being used in a moving vehicle by activating the NFC tag 160 (e.g., by tapping the mobile communications device 125, 135 on the NFC tag 160) positioned in the moving vehicle.

In some embodiments, the driver 120 of the moving vehicle 101 may activate an NFC tag that has been assigned to the driver 120 to indicate that the mobile communications device 125 has entered the vehicle 101 (whether or not the vehicle is in motion). In some embodiments, the driver 120 may indicate that the mobile communications device 125 has entered the vehicle 101 by docking the mobile communications device 125 in the dock 170. In certain embodiments, the driver 120 may use an application program of the mobile communications device 125 to indicate that the phone has entered the vehicle 101. In some embodiments, the restrictions imposed (e.g., on voice calls) may be removed when the communications device 125 is docked.

In certain embodiments, rapid changes in the location of the mobile communications device 125, 135 may be used as an indication that the mobile communications device is in a moving vehicle. For example, in certain embodiments, the speed at which the location of the mobile communications device 125, 135 is being changed may be used as an indication that the mobile communications device 125, 135 is in a moving vehicle 101. Specifically, in some embodiments, the mobile communications device 125, 135 may include a speed detector module or an application (not shown) program that detects the speed at which the location of the mobile communications device 125, 135 is being changed. Other indicating factors known in the art may be used to determine that the mobile communications device 125, 135 is being used within a moving vehicle. In some embodiments the functionality of the mobile communications device 125, 135 may continue to remain limited for at least a predetermined period of time that is long enough to avoid false deactivation caused by temporary stops of the vehicle 101, to avoid situations such as when the vehicle 101 has stopped at a traffic light or sign.

In some embodiments, the speed detector may be internal to the mobile communications device 125, 135. In certain embodiments, the speed detector may be external to the device and/or be physically or wirelessly coupled to the device. For example, in certain embodiments, the speed detector may be positioned upstream with respect to the mobile communications device 125, 135 and within the communications network 110.

In certain embodiments, the speed at which the location of the mobile communications device 125, 135 is being changed may be determined as a function of detecting the global positioning (GPS) of the mobile communications device 125, 135 over time. In some embodiments, the speed at which the location of the mobile communications device 125, 135 is being changed may be determined as a function of determining the cellular base station (not shown) serving the mobile communications device 125, 135 at any given time and/or the rate at which handoff between various base stations occurs. Any other technique known in the art may be used to determine the speed at which the mobile communications device 125, 135 is being moved.

In certain embodiments, the speed at which the location of the mobile communications device 125, 135 is being changed may be continuously monitored. Additionally or alternatively, in certain embodiments, the speed at which the mobile communications device 125, 135 is being moved may be monitored at predetermined time intervals. In some embodiments, the time intervals for monitoring the speed at which the mobile communications device 125, 135 is being moved may be set by the manufacturer of the mobile communications device 125, 135 or by the service provider providing mobile communications functions to the mobile communications device 125, 135.

In certain embodiments, if it is determined that the mobile communications device 125, 135 is in motion, the speed at which the mobile communications device 125, 135 is being moved may be compared against a predetermined speed threshold. In an event the speed of the movement of the mobile communications device 125, 135 is larger than the predetermined threshold, access to mobile communications functionalities may be restricted, controlled, and/or disabled.

In certain embodiments, multiple threshold levels may be used to control, restrict, or disable various mobile communications access functions. For example, in some embodiments, a first speed threshold may be used to control, restrict, or disable access to access functions, such as web browsing, using the mobile communications device 125/135 while in motion. A second, possibly higher or lower, speed threshold may further be used to control, restrict, or disable access to access functions, such as text messaging, using the mobile communications device 125/135 while in motion. In some embodiments, additional threshold levels may also be employed to control, restrict, or disable other mobile communications access functions (e.g., access to voice calls, video calls, etc.). In some embodiments, the instructions for modifying the restrictions imposed on the communications device may allow for modification of the restrictions based on the threshold levels. For example, the instructions may allow for restoration of phone calls if it is determined that the device is traveling below a certain speed threshold.

The speed threshold may be set using various factors. For example, in certain embodiments, the threshold may be set at a level that corresponds to traveling by any method other than walking. In certain embodiments, the threshold may be set at a level corresponding to traveling speed in a divided highway. In some embodiments, the speed threshold may vary dynamically and depending on the local traveling requirements. For example, when traveling in a school zone, the speed threshold may be changed to a lower level.

In some embodiments, the speed threshold may vary depending on the local laws and policies. For example, when traveling in a region that entirely prohibits use of mobile communications devices while driving, the speed threshold may be set to entirely prevent use of all access functions (e.g., text messaging, web browsing, voice calls, etc.) of the mobile communications device 125, 135. When traveling in regions that prohibit certain access functions (e.g., text messaging and web browsing) of the mobile communications device 125, 135 but allow certain other functions (e.g., voice calls), the speed threshold for the restricted functions may be set to ensure that such functions are restricted during access and speed thresholds for permitted functions are set to ensure that those functions are available while in motion.

In some embodiments, the speed threshold may vary depending on the amount of traffic on the travel route of the moving vehicle 101. In certain embodiments, the speed threshold may vary depending on the time of the day. For example, in some embodiments, the speed threshold may be reduced at dusk and returned to a higher level at dawn.

In some embodiments, the speed threshold may be pre-programmed by the original device manufacturer of the mobile communications device 125, 135. Additionally, or alternatively, in certain embodiments, the speed threshold may be set by the service provider that provides the communications access to the mobile communications device 125, 135. Further, in some embodiments, the speed threshold may be set by the manufacturer of the moving vehicle 101.

In some embodiments, the speed threshold may be obtained from a database (not shown) of appropriate speed thresholds. In some embodiments, the database of speed thresholds may be maintained locally within the mobile communications device 125, 135. In certain embodiments, the database may be stored outside of the mobile communications device 125, 135. For example, in some embodiments, the database may be maintained within the network and/or by the service provider that provides the mobile communications access to the mobile communications device 125, 135.

In some embodiments, multiple databases of speed thresholds may be utilized such that the speed threshold for controlling, restricting, or disabling a given function, at any given time, is selected from one of the available databases. In certain embodiments, the appropriate database for selecting the speed threshold may be chosen based on travel related factors, such as geographical location and traffic situations.

In some embodiments, in an event the speed at which the mobile communications device 125, 135 is being moved exceeds the predetermined threshold, mobile communications functionality may be modified or restored. In some embodiments, communications functions may be modified such that the user 120, 130 may be able to conduct a limited set of tasks. For example, in some embodiments, restrictions may be modified such that the user 120, 130 may access certain functions only when traveling at certain speeds (e.g., text messaging may be made possible when traveling at less than 5 miles per hour).

In some embodiments, restrictions may be modified or restored over a certain predetermined period of time. For example, in one embodiment, user may only be allowed to make phone calls having certain time durations (e.g., less than a minute long). In some embodiments, the time duration for making phone calls may be modified or controlled based on the location of the NFC tag 160. For example, a user using a tag 160 located adjacent to the back seat of the moving vehicle 101 may be allowed to conduct longer communications calls than a user using a tag 160 located in close proximity of the front passenger seat or in close proximity of the driver of the vehicle. In certain embodiments, the passengers 130 of the moving vehicle 101 may be allowed longer call times than the driver 120.

In some embodiments, restrictions may be modified such that the user 120, 130 can receive incoming communications calls or messages but cannot make any communications calls or send any messages. In certain embodiments, access may be modified such that the user may only receive communications calls or messages from a certain set of callers. For example, access may be restricted such that a teenage driver 120 may be able to receive communications calls from his/her caregivers. In some embodiments, the device manufacturer, vehicle manufacturer, or the service provider may control how and whether the restrictions can be modified. In some embodiments, the restrictions may be modified as a parental supervision feature by a caregiver of a user 120 (e.g., caregiver of a teenage driver allowing the driver to only make voice calls to the caregiver).

In some embodiments, restrictions may be modified such that one or more mobile communications functions are disabled. For example, in some embodiments, voice calls may be restored but web browsing functions may be disabled. In some embodiments, text messaging functions may be disabled while voice calls are restored. In some embodiments, voice functions (e.g., making or receiving phone calls) may be disabled. In certain embodiments, access to phone functions for making emergency phone calls may be allowed while voice functions are disabled.

In some embodiments, once an interaction between the communications device and the NFC tag is established, access to communications functions may be controlled, restricted, or modified by the service provider providing mobile communications access to the mobile communications device 125, 135. Additionally or alternatively, in certain embodiments, access to communications functions may be controlled, restricted, or modified from the mobile communications device 125, 135 side. For example, in one embodiment, the mobile communications device 125, 135 may include an application program that modifies, reduces, or disables certain communications functions (e.g., web browsing, text messaging, sending or receiving voice calls) of the mobile communications device 125, 135, once an interaction between the communications device and the NFC tag is established,. In certain embodiments, once an interaction between the communications device and the NFC tag is established, a module positioned within the network 110 may modify, reduce, or disable communications functions of the device.

In some embodiments, the instructions for removing the restrictions imposed on the mobile communications device 135 due to being in the moving vehicle 101 may be included in the mobile communications device 135. In such embodiments, the activation of the NFC tag 160 by the mobile communications device 135, or the recognition of the NFC tag 160 by the mobile communications device 135, results in activation and execution of the instructions stored in the mobile communications device 135. Once the instructions are executed, the imposed restrictions on the mobile communications device are removed.

In certain embodiments, the NFC tag 160 may be arranged to activate removal of the restrictions from one device at the time. Specifically, the NFC tag 160 may be arranged to activate a set of instructions that remove the restrictions from the communications device 135 for a predetermined period of time (e.g., two minutes). During that time period, no other device may be activated (i.e., restrictions from no other device may be removed) using the NFC tag 160.

In some embodiments, once the user 130 has completed using his/her mobile communications device 135 and the device 135 has been idle for a period of time, the restrictions previously imposed on the device 135 may once again be imposed on the device. The period of time that should lapse before the restrictions are imposed on the device 135 may be dictated by the device manufacturer, set by the device user 130, or set by the service provider.

In some embodiments, rather than being based on time, the restrictions may be imposed on the device 135 as soon as a communications session carried out by the user 130 is completed. For example, in some embodiments, the restrictions may be imposed upon completion of a phone call, transmission of a text message or an email, or once the user has exited a browser or an application program interface.

In some embodiments, if the passenger 130 wishes to continue to use the device 135, he/she may reactivate the instructions using the NFC tag 160, by again bringing the mobile communications device 135 in contact with or in close proximity of the tag 160. This may trigger the method described above.

Figure 2:
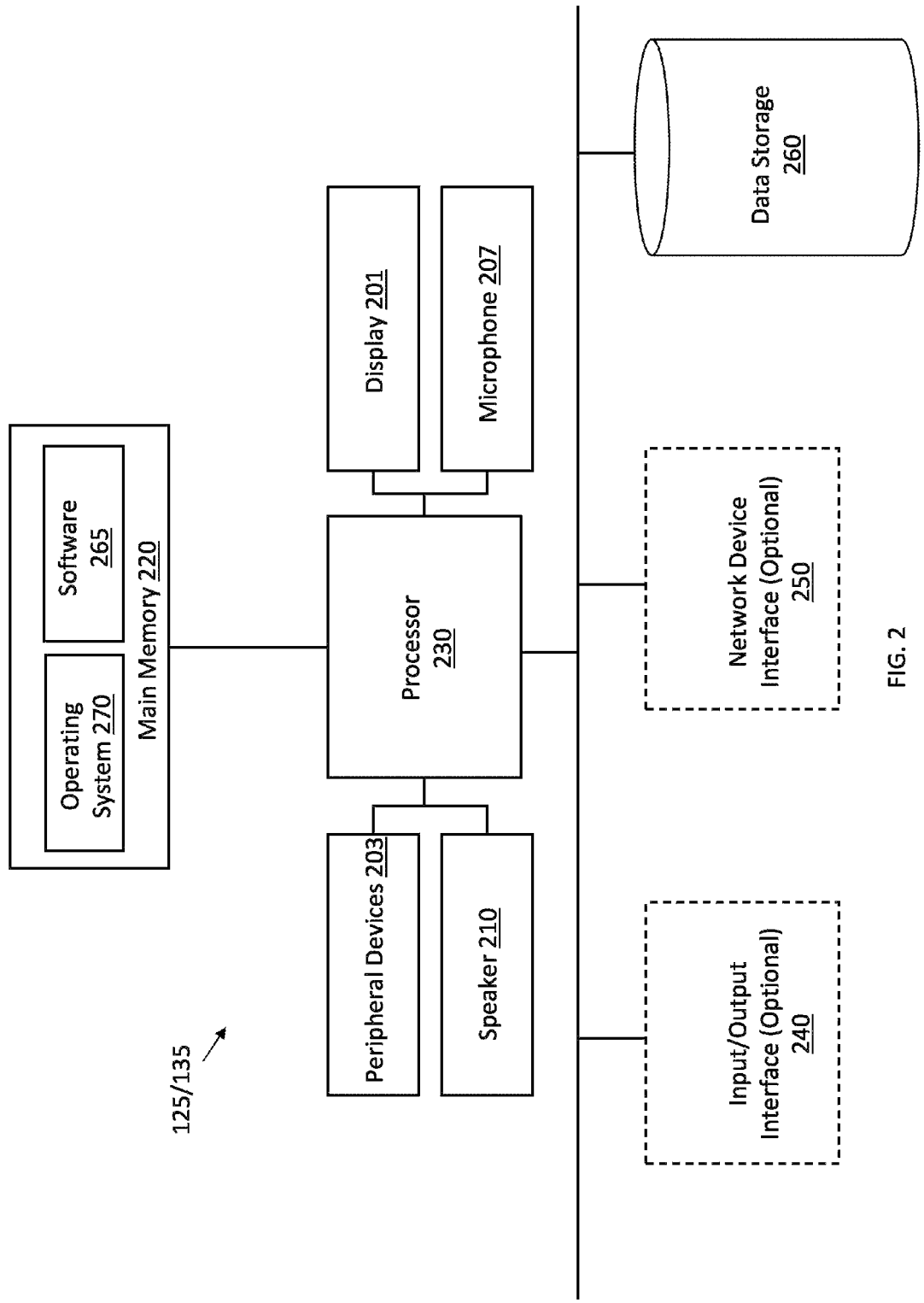
FIG. 2 is a block diagram of a communications device that may be used with certain embodiments disclosed herein.

FIG. 2 is a block diagram of a mobile communications device 125, 135 that may be used with certain embodiments disclosed herein. The device 125, 135 may include a processor 230 (e.g., Central Processing Unit) that carries out the operations of the device, executes various instructions, and manipulates data structures from the main memory 220. In some embodiments, the processor 230 may be coupled with a module (e.g., chip) that provides near field communications capabilities. The processor 230 may be coupled to a main memory 220. The main memory 220 may be a computer-readable memory and include combinations of non-volatile memory devices. The main memory 220 may be configured to hold various software 265 and computer-executable instructions and data structures including computer-executable instructions and data structures that implement aspects of the techniques described herein. In certain embodiments, the main memory 220 may be included in a subscriber identity module (SIM) card of the mobile communications device 125, 135. In certain embodiments, the main memory 220 may be included in a universal integrated circuit card (UICC) of mobile communications device 125, 135.

For example, in some embodiments, the software 265 may implement the procedures receiving and transmitting near field communications (NFC) signals. In certain embodiments, the software 265 may implement the procedures for reading the data and instructions included in an NFC tag 160 (FIG. 1). Further, the software may implement the procedures for executing the instructions included in the NFC tag 160. In some embodiments, the software 265 may implement the procedures that result in modifying, reducing, restricting, or restoring communications to the mobile communications device 125, 135. Alternatively, in some embodiments, an application program (not shown) or a module (not shown) positioned in the network 110 (shown in FIG. 1) may be responsible for modifying, reducing, restricting, or restoring communications to the mobile communications device 125, 135. For example, upon activation by the NFC tag 160, the mobile communications device 125, 135 may read and execute instructions (either included in the NFC tag 160 or included in the mobile device 125, 135) that trigger the mobile communications device 160 to connect to an application program or module positioned in the network 110. The application program or module, in response, transmits a set of instructions to the mobile communications device 125, 135, via the network 110. The instructions, once received by the device 125, 135, cause the removal of the restrictions imposed on the communications device 125, 135.

The main memory 220 may also include an operating system 270 that implements various conventional operating system functions including memory management and controlled access to various devices, such as a database storage 260, and task and process scheduling. The data storage 260 may include content, for use with embodiments disclosed herein, such as images, text, video, audio, and computer applications.

The processor 230 may be coupled to various interfaces via an input/output (I/O) device interface 240. The I/O device interface 240 may include logic to interface with various input and/or output devices, such as a keypad or mouse and with the processor 230, and allow signals to be transferred between the processor 230 and other components. Further, interface devices such as speaker 210, microphone 207, peripheral devices 203, and display 201 may be used to transfer signals to/from the processor 230 and main memory 220. In some embodiments, the input/output interface 240 may include a USB port (not shown).

In some embodiments, the device may include a network device interface 250 that provides the device with access to a network connection.

Figure 3:
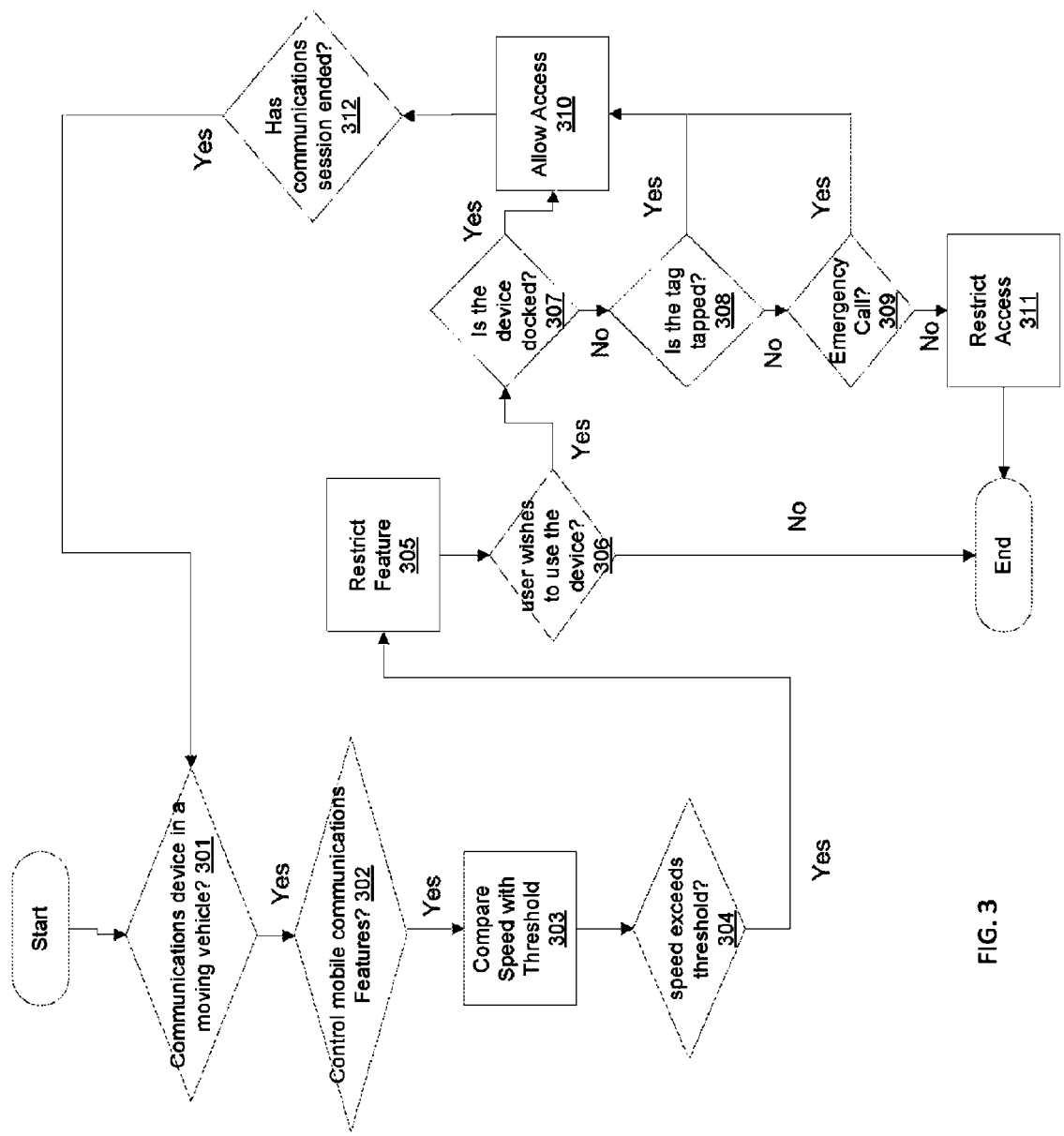
FIG. 3 is a flow diagram of procedures for certain embodiments disclosed herein.

FIG. 3 is a flow diagram of the procedures for controlling mobile communications access according to certain embodiments disclosed herein. The procedures begin by determining whether the mobile communications device is in a moving vehicle 301. As noted previously, the speed at which the location of the mobile communications device is changing may be used as an indication of whether the mobile communications device is moving. Once it is determined that the mobile communications device is in a moving vehicle, certain embodiments may proceed to determine if controlling mobile communications functions is desired 302. This may be done by evaluating travel route information and various other factors, such as local laws and policies (e.g., determining if local laws prohibit phone use or text messaging while driving).

If it is indicated that controlling of mobile communications functions is desired, the speed at which the mobile communications device is being moved is compared against a threshold 303. If the speed exceeds the threshold 304, communications functions corresponding to that threshold is restricted 305. For example, making voice calls may be allowed at lower speed levels (e.g., less than 25 miles per hour) while text messaging may be entirely prohibited. In such case, a first threshold for text messaging is exceeded once the device is in motion. A second threshold for making voice calls may also be utilized. In an event the speed at which the mobile device is being moved exceeds the second threshold, voice call functions are restricted.

While communications functions are restricted, the user may wish to use the mobile communications device 306. The user may express desire to use the mobile communications device by attempting to use the communications functions of the device (e.g., dial a number to make a phone call). In such case, certain embodiments verify whether the mobile communications device is docked and/or in a hands-free mode 307. If in the docked/hands-free mode 307, access to certain communications functions (e.g.,voice calls) is granted 310. If not in the docked mode, certain embodiments allow access 310 once the mobile communications device is topped against an NFC tag 308, As noted above, the NFC tag is positioned in the proximity of the passengers such that the passengers can easily access the NFC tag but the driver may not access the tag easily. The activation of the NFC tag triggers execution of instructions that restore access to the mobile communications device 310, If the mobile communications device is neither in a docked/hands-free mode nor used to activate the smart tag, certain embodiments may determine if the user is attempting to make an emergency call 309. If it is determined that the user is trying to make an emergency call, access to the functions of the mobile communications device 310 is permitted. Otherwise, access is restricted 311. In some embodiments, a signal (e.g., audio signal) may be issued to the user to indicate that the requested functions are not allowed while driving.

In some embodiments, once an allowed communications session is completed 312, the restrictions on the phone functions may once again be imposed on the mobile communications device (provided that the mobile communications device is still in a moving vehicle).

It is worth noting that the placement of one or more of the steps in the method shown in FIG. 3 may be different. For example, the mobile communications device, at 310, may detect whether or not it is docked before determining the speed or whether or not functions are to be controlled, thereby avoiding the processing involved in these latter steps. In certain embodiments, the ability to use the NFC tag may be deactivated until the restrictions are in place, i.e., the vehicle first must reach a speed at which functionality of the mobile communications device, at 310, is restricted before the NFC tag may be used, thereby reducing the possibility of the driver circumventing the restriction by using the NFC tag while the vehicle is stopped.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
imposing restrictions on a mobile communication device due to the module communications device being in a moving vehicle, wherein the imposed restrictions prevent a user from accessing any non-emergency mobile communications device functions;
at the mobile communications device disposed in a moving vehicle, interacting with a near field communications tag disposed in the moving vehicle; and
in response to interacting with the near field communications tag, modifying the imposed restrictions on the mobile communications device to allow use of a non-emergency mobile communications device function for a predetermined time period.

2. The method of claim 1 wherein the near field communications tag is disposed in an area of the moving vehicle that is relatively inaccessible to a driver of the moving vehicle when the vehicle is in motion, 3. The method of claim 1 wherein the imposed restrictions include restrictions that reduce or disable at least one of mobile communications functions provided by the mobile communications device, access to the mobile communications device, and access to the mobile communications functions provided by the mobile communications device.

4. The method of claim 3 wherein the mobile communications functions include at least one of voice call, video call, web browsing, text messaging, or instant messaging.

5. The method of claim 1 further including modifying the imposed restrictions to allow an emergency communications call in response to a request for conducting the emergency communications call.

6. The method of claim 1 wherein the mobile communications device includes instructions for modifying the imposed restrictions and further including activating the instructions for modifying the imposed restrictions in response to interacting with the near field 7. The method in claim 1 wherein modifying the imposed restrictions includes restoring a restricted subset of communications functions provided by the mobile communications device.

8. The method of claim 1 wherein modifying the imposed restrictions includes further restricting at least one of mobile communications functions provided by the mobile communications device.

9. The method of claim 1, wherein the remote database is selected from a plurality of databases containing local restrictions for mobile communications devices within mobile vehicles based on the determined regional location of the mobile communications device.

10. The method of claim 1, further comprising:
subsequent to modifying the imposed restrictions use of one or more mobile communications functions of the mobile communications device for the predetermined time period, preventing removal of restrictions during the predetermined time period from other mobile communications devices in the moving vehicle in response to interaction with the near field communications tag.

11. The method of claim 1, further comprising
in response to the mobile communications device being idle for a period of time once again imposing the restrictions previously imposed on the mobile communications device due to the the mobile communications device being in a moving vehicle.

12. A system comprising:
a near field communications tag, positioned in a moving vehicle; and
a processor, in a mobile communications device, configured to:
impose restrictions on the mobile communications device due to the mobile communications device being in the moving vehicle, wherein the imposed restrictions prevent a user from accessing any non-emergency mobile communications device functions; and
in response to interacting with the near field communications tag, modify the imposed restrictions on the mobile communications device in the moving vehicle to allow use of the non-emergency mobile communications functions for a predetermined time period.

13. The system of claim 12 wherein the near field communications tag is disposed in an area of the moving vehicle that is relatively inaccessible to a driver of the moving vehicle when the vehicle is in motion.

14. The system of claim 12 wherein the imposed restrictions include restrictions that reduce, or disable at least one of mobile communications functions provided by the mobile communications device, access to the mobile communications device, or access to the mobile communications functions provided by the mobile communications device.

15. The system of claim 14 wherein the mobile communications functions include at least one of voice call, video call, web browsing, text messaging, or instant messaging.

16. The system of claim 12 wherein the processor is arranged to modify the imposed restrictions to allow an emergency communications call in response to receiving a request for conducting the emergency communications call.

17. The system of claim 12, wherein the mobile communications device includes instructions for modifying the imposed restrictions and wherein the processor is arranged to modify the imposed restrictions in response to interacting with the near field communications tag and modifying the imposed restrictions using the activated instructions.

18. The system of claim 12 wherein the processor is arranged to modify the imposed restrictions by storing a subset of communications functions provided by the mobile communications device.

19. The system of claim 12 wherein the processor is arranged to modify the imposed restrictions by further restricting at least one of mobile communications functions provided by the mobile communications device.

20. The system of claim 12, wherein the database is selected from a plurality of database containing local restrictions for mobile communications devices within mobile vehicles based on the determined regional location of the mobile communications device.

21. The system of claim 12, wherein the processor is further arranged to;
retrieve local restrictions corresponding to a determined regional location of the mobile communications device from a database, wherein the database contains restrictions specific to the determined location of the mobile communications device.

22. A method, comprising steps of:
determining a mobile communications device disposed in a moving vehicle based on changes in a regional location of the mobile communications device;
in response to determining a regional location of the mobile communications device, accessing a database containing information related to regional restrictions to be imposed on the mobile communications device;
identifying restrictions corresponding to the determined regional location of the mobile communications device on mobile communication functions of the mobile communications device in the database;
imposing restrictions on one or more mobile communication functions of the mobile communications device based on the identified restrictions corresponding to the regional location of the mobile communications device; and
in response to interacting with a near field communications tag disposed in the moving vehicle, modifying the imposed restrictions on the mobile communications device in the moving vehicle to allow use of a non-emergency mobile communication function of the mobile communications device for a predetermined time period.

23. The method of claim 22, wherein different regional locations are able to have different restrictions.

* * * * *